United States Patent [19]

Whitehouse

[11] 4,334,282
[45] Jun. 8, 1982

[54] TESTING APPARATUS

[75] Inventor: David J. Whitehouse, Melton Mowbray, England

[73] Assignee: The Rank Organisation Limited, London, England

[21] Appl. No.: 103,591

[22] Filed: Dec. 14, 1979

[30] Foreign Application Priority Data

Dec. 14, 1978 [GB] United Kingdom ............... 48601/78

[51] Int. Cl.$^3$ ...................... G06F 15/336; G06G 7/19
[52] U.S. Cl. .................................. 364/728; 33/174 P; 364/507; 364/819
[58] Field of Search ............... 364/728, 819, 820, 822, 364/823, 552, 559, 507, 564; 343/100 CL; 367/125, 38–42; 324/77 G, 77 H; 33/174 L, 174 P, 174 PC

[56] References Cited

U.S. PATENT DOCUMENTS

| | | | |
|---|---|---|---|
| 3,359,409 | 12/1967 | Dryden | 364/728 |
| 3,571,579 | 3/1971 | Whitehouse et al. | 364/507 |
| 3,609,684 | 9/1971 | Lipp | 364/819 X |
| 3,626,168 | 12/1971 | Norsworthy | 364/728 X |
| 3,728,533 | 4/1973 | Matthews | 364/728 |
| 3,792,245 | 2/1974 | Hocker et al. | 364/728 |
| 3,819,920 | 6/1974 | Goldfischer | 364/728 X |

Primary Examiner—Joseph F. Ruggiero
Attorney, Agent, or Firm—Brisebois & Kruger

[57] ABSTRACT

A method of deriving the value of any one of the commonly used parameters for characterizing surfaces in surface measurement technology includes the steps of computing the autocorrelation function of a signal representing the surface, and selectively utilizing values of this autocorrelation function together with the value of the sampling interval used in generating the autocorrelation function, to derive the desired parameter values. This method considerably simplifies the information on a surface which is required, and enables micro-processor techniques to be used in the computation of the parameters.

5 Claims, 6 Drawing Figures

DETERMINATION OF AUTOCORRELATION FUNCTION

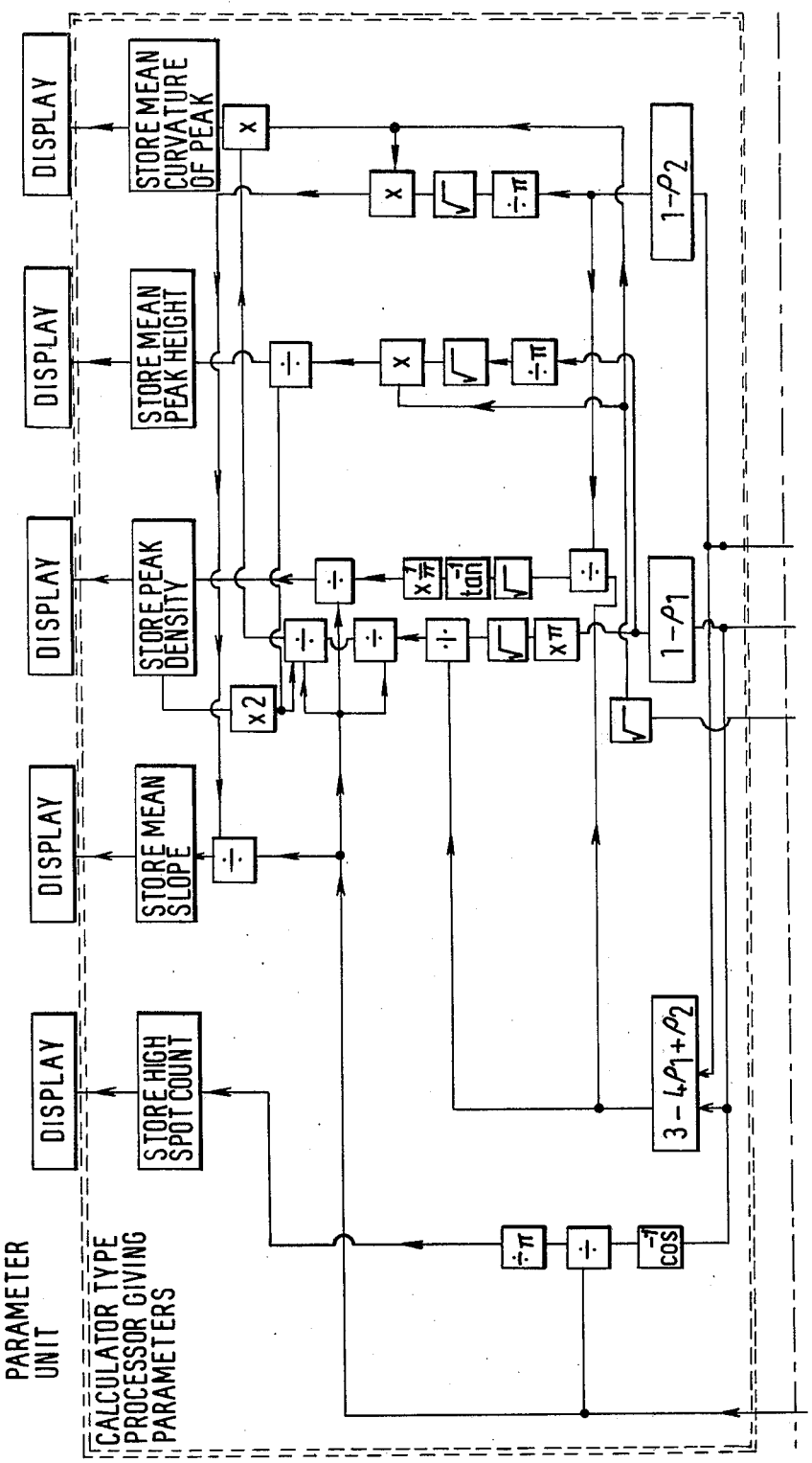
Fig.4.a. TRIBOLOGY PARAMETER UNIT

TESTING APPARATUS

The present invention relates to signal processing methods and apparatus for deriving the value of a parameter characterising a variable quantity by utilising autocorrelation function values of an input signal representing the variable quantity. In particular, but not exclusively, the invention relates to such methods and apparatus as applied to the evaluation of parameters characterising the surface topology of a component under test.

Throughout the specification particular reference will be made to the evaluation of the surface of a component or workpiece. Such surface evaluation is conventionally undertaken by means of a surface testing instrument employing a contact stylus or pick-up drawn over a path along the surface under test to produce an electrical signal which, when amplified, represents the variations in height of the surface along the path. Optical transducers have also been used employing interferrometric principles.

The electrical signal representing the surface contains all the information of interest to, for example, a manufacturer wishing to determine the results of a process on the surface, such as turning or grinding, but this information is not always readily apparent due to the complexity of the signal and the high degree of amplification which is necessary for display and to obtain the required sensitivity. Moreover, it is often required to be able to predict how the surface will behave in tribological situations, that is situations involving moving contact of the surface with another surface, for example to establish whether or not a suitable fit between two components has been acheived by the machining processes. For these, and other, purposes various parameters have been utilised for characterising the nature of the surface. Such parameters, include, for example, the centre line average, the high spot count, the peak density, mean peak height, mean curvature of peaks and mean slope of the signal. Such parameters are widely discussed in the literature of the art, and are well known to the man skilled in the art. For this reason they will not be defined in greater detail herein in their usual form. To produce an output signal representing any of the known parameters of the signal representing the surface (or, more generally, any variable quantity) it has generally been the practice to sample the electrical signal representing the surface and to perform operations on these samples in order to generate the required value. This sampling is carried out for each parameter it is desired to evaluate. Now, many of the known parameters are not independent from one another so that the process of deriving the values of the various parameters required for various differing purposes, has been unduly long and involved.

It is therefore an object of the present invention to provide a method of analysing a signal representing a variable quantity, such as the height variation of a surface under test, which enables the derivation of various characterising parameters from a minimum of data extracted from said signal.

It can be shown that the independent properties of a variable quantity such as the height of a surface are the height and the frequency of the asperities. In fact, for many tribological purposes, a random surface (such as one produced by grinding) can be described as a superposition of a plurality of asperities having differing scales of size. Moreover, it can be shown that the contribution each scale of size may make to any one tribological parameter can be evaluated using sampled data theory. Additionally, it can be shown that information on the two independent properties of a variable quantity such as the height of a surface can be derived from an electrical signal representing the profile of the surface using only two functions, that is the amplitude probability density function (giving amplitude information) and the normalised autocorrelation function (giving spacing information). These two functions are independent and by using measures of these two independent functions any one of the multiplicity of parameters previously independently measured and computed separately can be derived.

The amplitude probability density function of a surface gives information on the rate of change of the ratio of the material of the surface to air with height from the lowest valley to the highest peak of the surface.

Mathematically it is possible to find the moments of the curve of the amplitude probability density function in much the same way as the centre of gravity of an object and its centre of gyration are found in mechanical engineering. These moments of the curve are termed, respectively, the variance, the skew, and the kurtosis going in ascending order. The square root of the variance is in fact the root mean square value of the surface and so is an estimate of the size, but the other two mentioned (and others of higher order) can be used to derive information on the shape.

The autocorrelation function is useful in deriving the statistical properties pertaining to spatial features of a surface. As will be known to those skilled in the art the autocorrelation function is derived by obtaining a correlation function from a waveform with itself successively displaced by predetermined amounts called the sampling interval. Autocorrelation functions can probably best be obtained using digital techniques and have been employed in signal analysis methods used for a variety of applications (see, for example, U.S. Pat. No. 3,819,920 relating to doppler radar signal analysis, and U.S. Pat. No. 3,331,955).

Whereas, for a random surface, the autocorrelation function falls from an initial value to zero in a distance known as the independence length as will be discussed in greater detail below, the presence of periodic components in a waveform will cause the autocorrelation function itself to be periodic, repeating with the same wavelength as the periodic component in the original wave. The autocorrelation function is therefore very useful in detecting periodicities in the presence of random elements since, if the autocorrelation function does not decay away entirely, its value after one or two cycles is the periodic component of the profile; this is so, due to the fact that all random elements must disappear within the independence length. This is useful for detecting, for example, grinding chatter in a manufactured surface since this introduces an element of waviness into the profile which is so small that it cannot be seen.

One of the major problems in tribological situations is that of specifying the surface properties of mating surfaces. To control manufacture the surface parameter used need refer to only the surface in question whereas to predict tribological behaviour is must refer to both of two mating surfaces and it is the properties of the gap between the surfaces which are most likely to be significant. Unfortunately it is not usually possible merely to combine the surface parameters of the two mating surfaces (either by addition or subtraction) with one another in order to derive the properties of the gap. For example, the values of the parameter $R_a$ cannot be added to one another since the results would not be meaningful. Likewise, some of the more modern random process parameters such as the standard deviation of peak curvature would produce meaningless results if combined together.

It is accordingly a further object of the present invention to provide some means of introducing into such processes a quantity akin to dimensional tolerances which can be summed from one component to another in order to assess whether functional requirements of the surface, such as state, will be satisfied.

In accordance with one aspect of the present invention, there is provided a method of processing an input signal representing a variable quantity to derive the value of a selected parameter characterising that quantity, said method including the step of combining together, in predetermined manner, a data signal representing the value of a first origin-remote point of the autocorrelation function of the input signal with at least one further data signal selected from a signal representing the value of a second origin-remote point of said function, a signal indicative of the mean square value of the variable quantity, and a signal representing a sampling interval relating the said origin-remote point or points to the origin of the autocorrelation.

By selectively combining two or more of the above four data signals derivable from the input signal it is possible to determine various of the known parameters used in characterising, for example, surface profiles. The precise manner in which these signals are combined will be given below for a number of such parameters. It will be noted that, as indicated above, the signals used provide a measure both of amplitude information (the mean square value signal which as previously mentioned corresponds to variance), and spacing information (the autocorrelation value signals).

Preferably the two selected origin-remote points on the autocorrelation of the signal are spaced respectively, at the sampling interval and at twice the sampling interval from the origin. Likewise, the mean square value of the variable quantity is preferably obtained by deriving the origin value of the input signal.

In order to give the results general applicability it is preferred that the signals representing the values of the origin-remote autocorrelation points are normalised. This normalisation can be effected by dividing the signals representing the values of the origin-remote autocorrelation points by the signal representing the mean square value of the variable quantity (the variance). As previously noted, this variance signal is preferably a signal representing the origin value of the autocorrelation.

In its application to the evaluation of the surface of a component, the present invention preferably includes the steps of producing an input electrical signal representative of the variable quantity constituted by the height of the surface of said component along a path thereacross, processing said input signal to derive data signals representative of the value of the autocorrelation of said input signal at three selected points respectively residing at the origin of the autocorrelation, at a distance spaced from said origin by a predetermined sampling interval, and at a distance spaced from the said origin by twice said sampling interval, the origin-value data signal being indicative of the mean square value of said variable quantity, and selectively utilising the three autocorrelation-value data signals and a further data signal representative of the value of said sampling interval to derive an output signal representative of the value of a selected one of a plurality of surface topology parameters.

Preferably, the electrical input signal is derived from a traverse of a transducer sensitive to surface height variations along a path on the surface. Such a transducer may be a stylus pick-up instrument drawn in contact with the surface of the component under test along the said path, or may be a non-contact type of instrument such as an optical transducer.

Preferably, as a first stage in utilising the autocorrelation-value data signals, two normalised data signals are derived by dividing the values of the two origin-remote autocorrelation points by the origin value of the autocorrelation in order to normalise the origin-remote values.

Given below are a number of relationships for deriving tribological parameters by selectively combining the data signals derived from the input signal representing the height variation of the surface under test. It will be appreciated that in fact these relationships can be used to process and analyse input signals representing variable quantities other than surface height.

One of the parameters of interest in tribological assessments of surfaces is the high spot count, and in accordance with the principles of the present invention a signal representing the value of this parameter can be generated by combining the signal representing the sampling interval with the signal representing the normalised value of the autocorrelation at the sampling interval from the origin in the relationship $(1/\pi h) \cos^{-1} \rho_1$, where: $\rho_1$ is the normalised value of the autocorrelation spaced at the sampling interval from the origin and, h is the sampling interval, that is the spacing of the digital readings taken in determining the autocorrelation of the input signal representing surface height variation.

The density of peaks counted on a profile when digital techniques are used is also an important parameter, particularly in the steel industry where the peak count is one of the central parameters of interest. It can be shown, using the principles of the present invention that the peak density can be derived by combining signals representing the normalised values of the two origin-remote autocorrelation points with a signal representing the sampling interval in the relationship:

$$\frac{1}{\pi h} \tan^{-1} \left[ \frac{3 - 4\rho_1 + \rho_2}{1 - \rho_2} \right]^{\frac{1}{2}}$$

where:

$\rho_1$ is the normalised value of the autocorrelation at a spacing equal to the sampling interval from the origin, $\rho_2$ is the normalised value of the autocorrelation at a spacing equal to twice the sampling interval from the origin, h is the sampling interval.

Of particular interest in tribology is the way in which the density of peaks changes from surface to surface, the way in which the mean peak height depends on the correlations between ordinates (that is the points at which samples of the value of the input signal representing surface height variation are taken) and the relationship between peak height and the curvature of the peak height. The mean peak height can be obtained, according to the principles of the present invention, from the probability density function using, results for the moments of a truncated trivariate normal distribution known in the art. For this, a peak is defined, using three ordinates, when the central ordinate is higher than the other two, and it can be shown from this that the parameter known as the "mean peak height" can be generated from a signal representing the normalised value of the autocorrelation at a distance equivalent to the sampling interval from the origin by combining this with a signal representing the square root of the mean square value of the surface height variation and with a signal representing the peak density as defined above, by the relation:

$$\frac{\sigma}{2D}\left(\frac{1-\rho_1}{\pi}\right)^{\frac{1}{2}}$$

where:
$\rho_1$ is the normalised value of the autocorrelation at a spacing equal to the sampling interval from the origin,
$\sigma$ is the square root of the mean square value of the surface height variation, and
D is the peak density as defined above. As mentioned above not only the mean peak height and peak density are of interest in tribology, but also the curvature of the peaks, especially when contact properties are being considered. Whether or not surface peaks deform elastically or plastically is determined by the plasticity index $\psi$ which is given by:

$$\psi = \frac{E}{H}\left(\frac{\sigma}{R}\right)^{\frac{1}{2}}$$

where:
E is the elastic modulus of the surface,
H is the hardness,
$\sigma$ is the root mean square (standard deviation) of the peak height distribution, and
R is the radius of curvature of the peaks.

Obviously, in all wear situations, R is a critical factor. From the probability density function of the distribution of the curvature of the peaks, which is obtained from the convolution of the joint probability density function of a bivariate normal distribution when both variables are truncated below at zero, it can be shown that the mean peak curvature can be derived from the signals representing the normalised values of the two origin-remote autocorrelation points by combining these with a signal representing the root mean square value of the surface height variation, a signal representing the peak density as defined above, and the signal representing the sampling interval in the relation:

$$\frac{\sigma(3-4\rho_1+\rho_2)}{2Dh^2[\pi(1-\rho_1)]^{\frac{1}{2}}}$$

where:
$\rho_1$ is the normalised value of the autocorrelation at a spacing from the origin equal to the sampling interval, $\rho_2$ is the normalised value of the autocorrelation at a spacing from the origin equal to twice the sampling interval,
$\sigma$ is the root mean square value of the surface height variation,
D is the peak density, and
h is the sampling interval.

The variance of the peak curvature can also be determined, and from a knowledge of this and of the mean peak curvature, the proportion of peaks on the surface which will elastically or plastically deform may be estimated. This is an important tribological feature which has so far been neglected.

For verification of these results the special case when $\rho_1=\rho_1^2$ may be considered (that is the case of an exponential autocorrelation function) in which case the expressions reduce to results previously obtained and verified and known in the art.

It is possible to obtain similar results for the height and curvature of valleys, which can also be important in frictional studies involving the passage of fibres over rollers, or similar applications.

If the parameter of interest is the mean slope of the surface height variation, this can be derived from a signal representing the normalised value of the autocorrelation at twice the sampling interval from the origin by combining this signal with a signal representing the root mean square value of the surface height variation and a signal representing the sampling interval in the relation:

$$\frac{\sigma}{h}\left(\frac{1-\rho_2}{\pi}\right)^{\frac{1}{2}}$$

where:
$\rho_2$ is the normalised value of the autocorrelation at a spacing from the origin equal to twice the sampling interval,
$\sigma$ is the root mean square value of the surface height variation, and
h is the sampling interval.

Many other parameters can be determined by selectively using only the values of the two origin-remote points on the autocorrelation, the sampling interval and the root mean square of the surface height variation. For example the root mean square curvature of the surface height variation can be determined by the relation:

$$\text{RMS curvature of profile} = \sigma\sqrt{\frac{6-8\rho_1+2\rho_2}{h^4}}$$

where:
$\rho_1$ is the normalised value of the autocorrelation at a spacing corresponding to the sampling interval from the origin,
$\rho_2$ is the normalised value of the autocorrelation at a spacing corresponding to twice the sampling interval from the origin,
$\sigma$ is the root mean square value of the surface height variation, and
h is the sampling interval.

Likewise the correlation between curvature and peak height can be derived from the relation:

$$\frac{2(1-\rho_1)}{(6-8\rho_1+2\rho_2)^{\frac{1}{2}}}$$

where $\rho_1$ and $\rho_2$ have the significance previously assigned to them. The standard deviation of the peak distribution is given by the relation:

$$K\left[1+\frac{\left(\frac{1-\rho_1}{2\pi}\right)\left(\frac{1-\rho_2}{3-4\rho_1+\rho_2}\right)^{\frac{1}{2}}}{D}-\frac{\left(\frac{1-\rho_1}{4\pi}\right)}{D^2}\right]$$

where K is a scaling factor dependent on the value of the root mean square of the surface height variation. If $\sigma=1$ then $K=1$.

The RMS value of peak curvature is given by the relation:

$$\frac{3-4\rho_1+\rho_2}{4\pi h^4(1-\rho_1)}\left[8\pi(1-\rho_1)+\frac{2(3-4\rho_1+\rho_2)(1-\rho_2)^{\frac{1}{2}}}{D}-\frac{(3-4\rho_1+\rho_2)}{D^2}\right]^{\frac{1}{2}}$$

where:
D is the peak density as defined above and $\rho_1$, $\rho_2$, and h have the previously assigned significance.

Other parameters, such as the correlation between a peak of given curvature at given height can also be determined. This latter is given by the relation:

$$\left[1-\frac{(1-2\rho_1^2+\rho_2)}{(3-4\rho_1+\rho_2)}\text{ (RMS of peak height)}\right]^{\frac{1}{2}}$$

The advantage of using signals representing the normalised value of the autocorrelation function at points related to the sampling interval at which samples are taken in computing the autocorrelation function are that in determining the properties of a gap between two mating surfaces the values of the autocorrelation function can simply be summed to derive equivalent autocorrelation values of the gap between the two surfaces. The resultant signals can then be selectively combined with a signal representing the root mean square value of the gap between the two surfaces and/or a signal representing the sampling interval used in determining the autocorrelations to provide the value of a selected tribological parameter of the gap between the surfaces.

In accordance with a further aspect of the present invention, there is provided apparatus for processing an input signal representing a variable quantity to derive the value of a selected parameter, characterising that quantity, said apparatus comprising:

a correlator arranged to receive said input signal and to generate three data signals respectively representative of the value of the autocorrelation of the input signal at the origin of the autocorrelation, at a distance spaced from said origin by a predetermined sampling interval, and at a distance spaced from said origin by twice said sampling interval, the correlator being further arranged to generate a fourth data signal representative of said sampling interval, and signal combining means connected to receive said four data signals and arranged to selectively combine them to derive an output signal representative of the value of a selected one of a plurality of parameters.

Aspects of the present invention will now be more particularly described, by way of example, with reference to the accompany drawings, in which:

FIG. 1, including A-E is a set of waveforms illustrating the formation of an autocorrelation function of one type of electrical signal;

FIG. 2, including A-F is a set of waveforms illustrating the formation of an autocorrelation function of an electrical signal incorporating a periodic component;

FIGS. 4A and 4B show respective mating halves of a block diagram illustrating one possible series of steps in the process of producing outputs representing a number of tribological parameters from signals representing the surface profile of a component under test.

Figure 1:
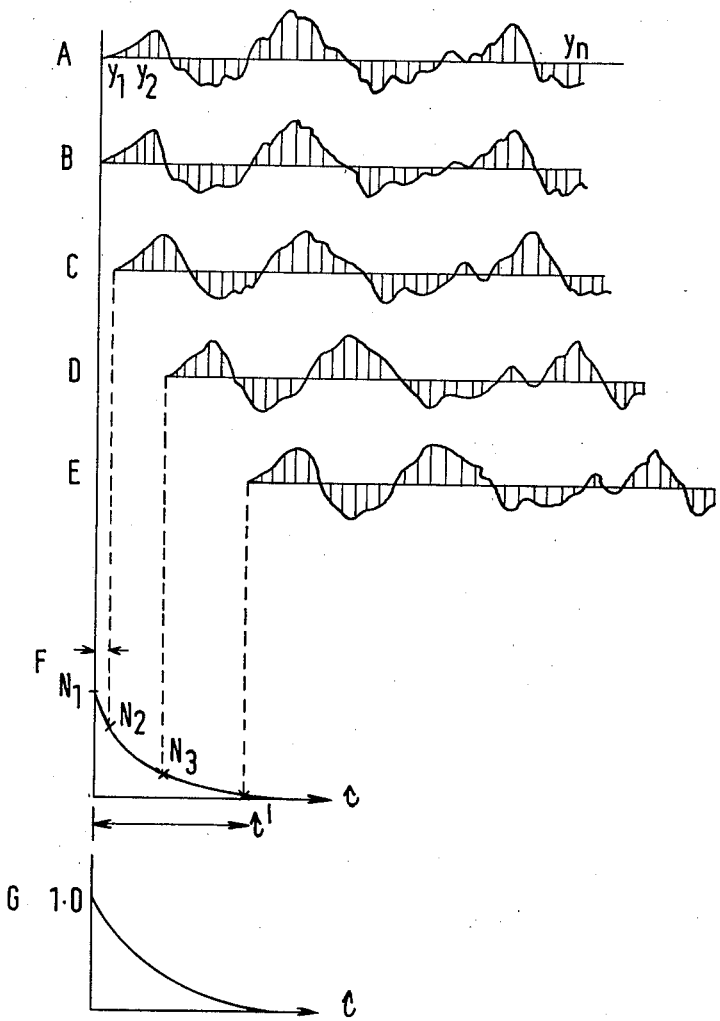

Referring first to FIG. 1 there is shown a waveform A representing the profile of a surface, such as the signal generated by a surface testing instrument. In order to determine the autocorrelation function for this waveform it is sampled at a plurality of points to measure the value of the signal in terms of its displacement from the mean line in order to derive values thereof at a predetermined spacing interval h, such values being indicated $y_1, y_2, y_3 \ldots y_n$. The same profile signal is then superimposed on the original as shown in curve B and the same process repeated. Each sampled value ($y_i$) of the profile signal is termed on ordinate. The ordinates of the two signals A and B are then each multiplied by the corresponding ordinate directly aligned with it, and all of these products are then summed. Since the two signals are exactly in phase all the products will be positive. The products are then divided by the total number of products and the resultant $N_1$ is plotted as the ordinate at the origin on a new graph F. The profile signal B is then displaced to the right by a distance equal to the sampling interval and the newly aligned ordinates are multiplied as before. This time each ordinate of signal B is multiplied with that ordinate which would have been spaced one position to the left of it in signal A in the original position. Again, the products are summed and divided by the total number of products. This time some of the products will be negative since, in the region of the intersection with the mean line, some positive ordinates will be multiplied with some negative ordinates. The value (say $N_2$) of the resultant obtained by dividing the summed products is plotted on curve F as the second ordinate shifted to the right of the origin by the sampling interval. Because some of the products were negative the value of $N_2$ will be less than the value of $N_1$. This process is repeated each time displacing the signal B one sampling interval to the right.

Figure 2:
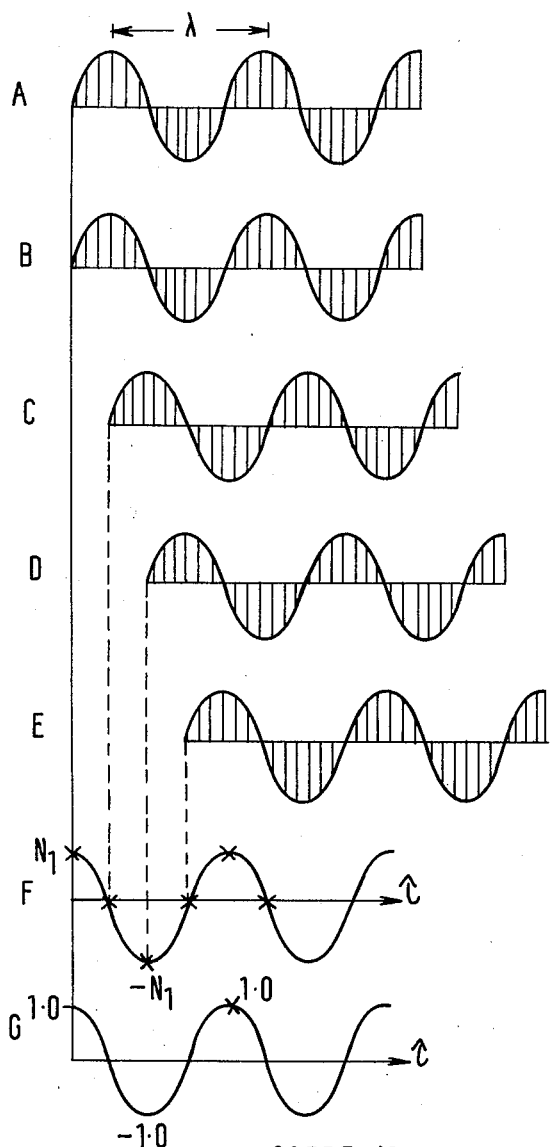

This process is repeated continuously, each time shifting the lower profile further to the right and plotting the value of N in a corresponding position on the graph F. If the profile is random, as in the example shown, the value of N will fall eventually to a low value or zero, and will not rise again to any significant extent irrespective of how far to the right the lower profile is shifted and how long the computing process is continued. This is because, eventually, as the displacement gets larger, any one feature on the lower profile bears no relationship to the feature directly above it on the upper profile. Hence there is an equal probability of the products of ordinates being positive or negative, that is the product sign can be equally probably obtained by the product of two positive values, a negative and a positive value, a positive and a negative value, or a negative and a negative value and this being the case the resultant sum is obviously zero. The distance through which the line B has to be displaced in order to achieve this condition on the graph of N is called the independence length of the profile. Normalisation of the graph F is achieved by dividing the value of each ordinate by the value of the first ordinate so that the curve decays from a value of one unit to zero. This is illustrated in curve G which then represents the autocorrelation function of the curve represented in line A. It should be noted that the physical dimension of the abscissa of the autocorrelation function is one of length, the units being the same as those of the horizontal axis of the profile graph. This means that the curve of the autocorrelation function can be compared directly, in the length direction, with the profile itself. This is an important idea in the development of the present invention. If a similar computation is carried out on a periodic wave, as shown in FIG. 2, the normalised autocorrelation function g will also be periodic because the condition for a maximum value of unity arises every time the displacement of the signal B is an integral number of wavelengths of the periodicity. The autocorrelation function thus repeats with the same wavelength as the original wave; it never decays away as the displacement is increased unlike the autocorrelation function of a random profile, which does. It will be appreciated, therefore, how the autocorrelation function can be used to detect periodicities in the presence of random elements. If the autocorrelation function does not decay to zero, the periodic component thereof represents the periodic component of the profile. All random elements must disappear within the independence length so that even if, for example, grinding chatter is introducing an element of waviness into a profile which is too small to be detected by other techniques, it can be sensed using the autocorrelation function and appropriate remedial action on the machine taken.

Figure 3:
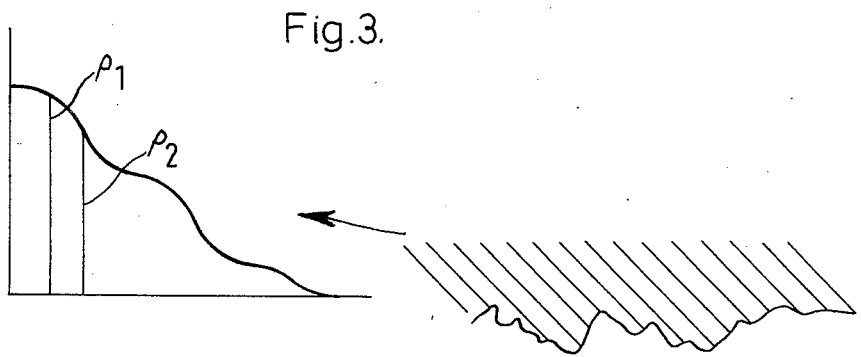
FIG. 3 is a diagram illustrating the formation of an autocorrelation function of the interspace between two surfaces which are to be in contact.
Figure 3:
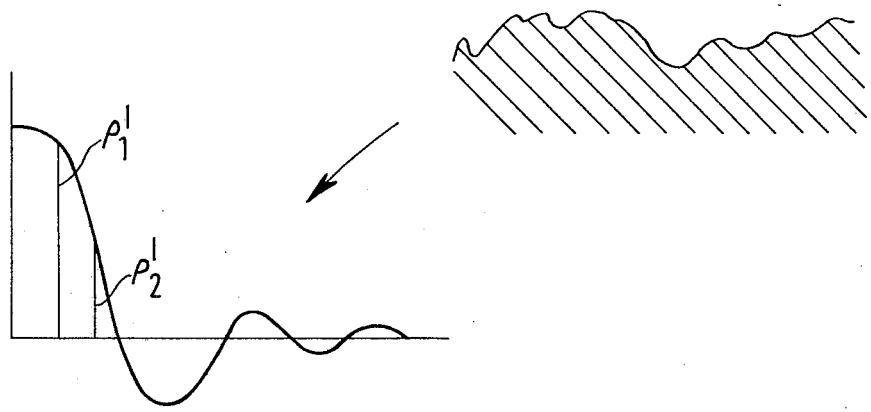
Figure 3:
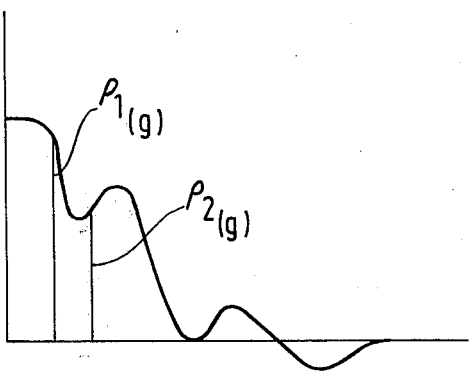

As can be seen with reference to FIG. 3 the two values of the autocorrelation function of interest in the present invention, that is the value of the autocorrelation function at a distance equal to the sampling interval and to twice the sampling interval from the origin, can be determined for two surfaces, and the corresponding values of the autocorrelation function of the combined signals, which represent the gap between the two surfaces, can be derived simply by summing the corresponding values of the two autocorrelation functions to derive what is, in effect, an autocorrelation function of the gap. From this the parameters of interest can be derived directly using the expressions given above so that the behaviour of the two components in tribological situations can be assessed.

Figure 5:
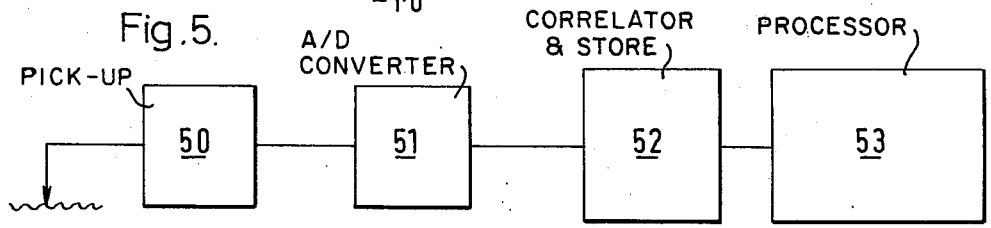
FIG. 5 is a block diagram schematically illustrating how the same thing may be achieved using a microprocessor.
Figure 4B:
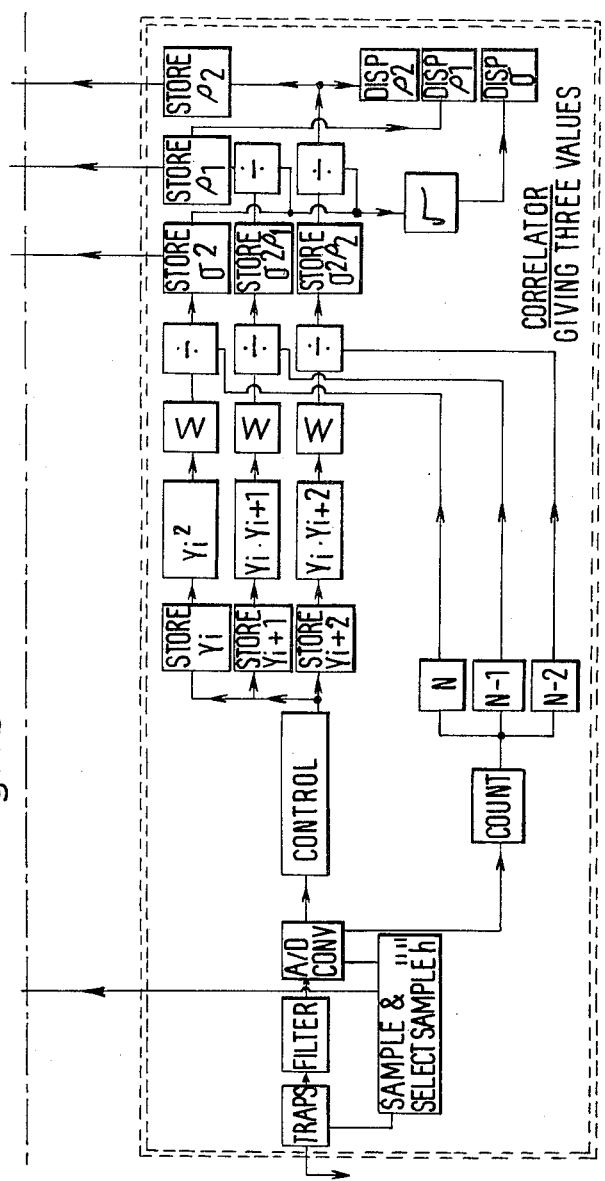

FIG. 4 illustrates a block diagram showing how the parameters discussed above could be computed. The legends to the boxes in the diagram illustrate the processes performed therein. Dedicated apparatus formed in accordance with this block diagram would be difficult to produce, however, and it is considered more suitable for the techniques to be undertaken using a microprocessor programmed to perform appropriate routines to generate the parameters indicated, as shown schematically in FIG. 5. This figure shows a pick-up 50 of the stylus type the analogue output signal of which is fed to an analogue-to-digital converter 51. The digitised signals are then fed to a correlator and store 52 which has three outputs on which are fed out signals representing, respectively, the said two values of the autocorrelation function computed from the incoming digital data, and (also computed from the incoming digital data) the root mean square value of the profile height, which latter constitutes the variable quantity. These three output signals are then fed to a processor 53 which computes from the incoming signals the value of the required parameter from a programme selected by an operator from among a number of such programmes previously written into the processor for computing, for example, one of the relations set out above, or some other relation for another parameter calculated in the same way as those outlined herein to involve only the three signals given. The functions of the analogue-to-digital converter 51, the correlator and store 52, and the processor 53 could all be performed by one microprocessor such as, for example, a Motorola 6800. The external equipment of the microprocessor could include a set of push buttons for selecting, in the simplest possible manner, the programme to be performed by the processor 53 to generate the value of a selected parameter.

I claim:

1. A method of generating output signals representative of a plurality of parameters characteristic of the surface topology of a component, said method comprising the steps of:
producing an input electrical signal representative of the variable quantity constituted by the height of the surface of said component along a path thereacross,
processing said input signal to derive data signals representative of the value of the autocorrelation of said input signal at three selected points respectively residing at the origin of the autocorrelation, at a distance spaced from said origin by a predetermined sampling interval, and at a distance spaced from said origin by twice said sampling interval, the origin-value data signal being indicative of the mean square value of said variable quantity, storing said three autocorrelation-value data signals, and selectively utilising the three autocorrelation-value data signals and a further data signal representative of the value of said sampling interval to derive output signals representative of the values of selected ones of a plurality of surface topology parameters taken from the group comprising the high spot count, mean slope, peak density, mean peak height, mean curvature of peak, RMS curvature of profile, correlation between curvature and peak height, RMS of peak distribution, RMS of peak curvature, and correlation between a peak of given curvature at a given height.

2. A method according to claim 1, wherein the three autocorrelation-value data signals are utilised to derive two normalised data signals representing the values of the two origin-remote autocorrelation points normalised by division by the mean square value of the variable quantity as given by the value of the autocorrelation at its origin, said normalised data signals being used in the derivation of said output signal.

3. A method as claimed in claim 2, in which said input electrical signal is derived from a traverse of a transducer sensitive to surface height variations along a path on the surface of said component.

4. A method of determining the value of a tribological parameter of a gap between two surfaces wherein for each surface two normalised data signals are derived in accordance with claim 2 and corresponding ones of the normalised data signals of the two surfaces are thereafter summed to form gap signals representing autocorrelation values of said gap between the two surfaces, the gap signals being selectively utilised together with said data signals representing the sampling interval and said origin-value data signals of the two surfaces, to derive an output signal representative of the value of said tribological parameter.

5. Apparatus for processing an input signal representing a variable quantity to devise the value of a selected one of a plurality of parameters characterising that quantity, said apparatus comprising:

a correlator arranged to receive said input signal and to generate and store three data signals respectively representative of the value of the autocorrelation of the input signal at the origin of the autocorrelation, at a distance spaced from said origin by a predetermined sampling interval, and at a distance spaced from said origin by twice said sampling interval, the correlator being further arranged to generate a fourth data signal representative of said sampling interval, signal combining means connected to receive said four data signals and arranged to selectively combine them to derive an output signal representative of the value of said selected one of said plurality of parameters, and combining means to effect the required selective combination of the data signals.

* * * * *